US011714460B2

(12) United States Patent
Li et al.

(10) Patent No.: US 11,714,460 B2
(45) Date of Patent: Aug. 1, 2023

(54) SLIDE RAIL MECHANISM, RETRACTABLE SCREEN STRUCTURE AND ELECTRONIC DEVICE

(71) Applicant: BEIJING XIAOMI MOBILE SOFTWARE CO., LTD., Beijing (CN)

(72) Inventors: Pengfei Li, Beijing (CN); Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/555,604

(22) Filed: Dec. 20, 2021

(65) Prior Publication Data
US 2022/0413558 A1    Dec. 29, 2022

(30) Foreign Application Priority Data

Jun. 25, 2021 (CN) .......................... 202110711433.8

(51) Int. Cl.
*G06F 1/16* (2006.01)
(52) U.S. Cl.
CPC .......... *G06F 1/1675* (2013.01); *G06F 1/1624* (2013.01); *G06F 1/1652* (2013.01)
(58) Field of Classification Search
CPC ..... G06F 1/1675; G06F 1/1624; G06F 1/1652
See application file for complete search history.

(56) References Cited

U.S. PATENT DOCUMENTS

| | | | | |
|---|---|---|---|---|
| 6,771,232 B2* | 8/2004 | Fujieda | ................. | G06F 1/1656 345/55 |
| 7,667,962 B2* | 2/2010 | Mullen | ................. | G06F 1/1605 359/461 |
| 7,724,508 B2* | 5/2010 | Bemelmans | .......... | G06F 1/1615 345/169 |
| 9,823,697 B2* | 11/2017 | Hsu | ....................... | G06F 1/1624 |
| 11,464,121 B2* | 10/2022 | Liu | ..................... | H05K 5/0217 |
| 2003/0218860 A1* | 11/2003 | Shiraiwa | ............... | G06F 1/1622 361/679.04 |

(Continued)

FOREIGN PATENT DOCUMENTS

CN    112947688 A    6/2021
JP    2010283578 A    12/2010

(Continued)

OTHER PUBLICATIONS

European Patent Application No. 21218161.4, Search and Opinion dated Jun. 14, 2022, 9 pages.

(Continued)

*Primary Examiner* — Adrian S Wilson
(74) *Attorney, Agent, or Firm* — Cozen O'Connor

(57) ABSTRACT

A slide rail mechanism for a retractable screen structure includes a holder assembly including a holder; and a slide rail assembly including a fixed seat fixedly coupled to the holder, a sliding member coupled to a flexible display screen of the retractable screen structure and arranged on the fixed seat and slidable along a first direction, and an elastic assembly having a first end coupled to the fixed seat and a second end coupled to the sliding member. The second end of the elastic assembly and the flexible display screen are driven to move together when the sliding member slides along the first direction relative to the fixed seat.

19 Claims, 6 Drawing Sheets

(56) References Cited

U.S. PATENT DOCUMENTS

| | | | | |
|---|---|---|---|---|
| 2004/0183958 | A1* | 9/2004 | Akiyama | G09F 9/30 349/58 |
| 2005/0041012 | A1* | 2/2005 | Daniel | G09F 9/301 345/156 |
| 2008/0153558 | A1* | 6/2008 | Mifune | H04M 1/0237 455/575.4 |
| 2010/0177020 | A1* | 7/2010 | Bemelmans | G09F 9/301 345/55 |
| 2011/0051347 | A1* | 3/2011 | Yamagiwa | H04M 1/0239 361/679.11 |
| 2012/0314400 | A1* | 12/2012 | Bohn | G09F 9/35 361/679.01 |
| 2013/0058063 | A1* | 3/2013 | O'Brien | G06F 1/1624 361/807 |
| 2020/0264660 | A1* | 8/2020 | Song | G06F 1/1624 |
| 2020/0329572 | A1* | 10/2020 | Wittenberg | H05K 5/0017 |
| 2020/0409421 | A1* | 12/2020 | Cho | H04M 1/0268 |
| 2021/0044683 | A1* | 2/2021 | He | G06F 1/1624 |
| 2021/0219437 | A1* | 7/2021 | Kim | H04M 1/026 |
| 2022/0019260 | A1* | 1/2022 | Kang | G06F 1/1688 |
| 2022/0019261 | A1* | 1/2022 | Kang | H01Q 1/243 |
| 2022/0180777 | A1* | 6/2022 | Liu | G09F 9/301 |
| 2022/0183166 | A1* | 6/2022 | Liu | H04M 1/0237 |
| 2022/0183167 | A1* | 6/2022 | Liu | H05K 5/0217 |
| 2022/0232716 | A1* | 7/2022 | Lim | H04M 1/0237 |
| 2022/0240400 | A1* | 7/2022 | Zhou | G06F 1/1624 |
| 2022/0303373 | A1* | 9/2022 | Kang | G06F 1/1652 |

FOREIGN PATENT DOCUMENTS

| | | |
|---|---|---|
| JP | 2014531796 A | 11/2014 |
| KR | 20160141255 A | 12/2016 |
| KR | 20170025520 A | 3/2017 |
| KR | 20170116551 A | 10/2017 |
| KR | 20180038605 A | 4/2018 |
| KR | 20200013821 A | 2/2020 |
| WO | WO 2021025198 A1 | 2/2021 |

OTHER PUBLICATIONS

Japanese Patent Application No. 2021-214949, Office Action dated Feb. 7, 2023, 7 pages.

Japanese Patent Application No. 2021-214949, English translation of Office Action dated Feb. 7, 2023, 6 pages.

Korean Patent Application No. 10-2021-0178665, Office Action dated Jan. 4, 2023, 6 pages.

Korean Patent Application No. 10-2021-0178665, English translation of Office Action dated Jan. 4, 2023, 7 pages.

\* cited by examiner

SLIDE RAIL MECHANISM, RETRACTABLE SCREEN STRUCTURE AND ELECTRONIC DEVICE

CROSS-REFERENCE TO RELATED APPLICATIONS

This application claims benefit of and priority to Chinese Patent Application Serial No. 202110711433.8, filed on Jun. 25, 2021, the entire contents of which are incorporated herein by reference.

FIELD

The present disclosure relates to the field of retractable screen products and, more particularly, to a slide rail mechanism, a retractable screen structure, and an electronic device.

BACKGROUND

With the continuous progress of screen technology, mass production of foldable flexible screens has been realized and flexible display screens that measure 0.01 mm in thickness are available globally, thus enriching the form factor of terminal products from smart wearables to smart home devices to smart phone terminals. Ultra-thin flexible screens allow diverse designs of future products, such as foldable cell phones, ring-shaped cell phones, and special-shaped curved terminal products. Moreover, the arrival of 5G realizes electrical connection of all intelligent products and accelerates data transmission between products. Further some modules of intelligent terminal products can still function even if they are separated from the intelligent terminal products, such as camera modules and BOX acoustic modules. The development of battery technology achieves higher battery capacity, and makes the terminal products smaller in size and the terminal product design form factor more flexible.

With the rise in demand for flexible screen products, display areas need to be increased or decreased to enhance product experience when users deal with different operational tasks, e.g., watching videos and making phone calls. There are currently two main screen expansion structures: foldable screen structures and retractable screen structures.

SUMMARY

Embodiments of the present disclosure provide a slide rail mechanism for a retractable screen structure. The slide rail mechanism includes: a holder assembly including a holder; and a slide rail assembly including: a fixed seat fixedly coupled to the holder, a sliding member coupled to a flexible display screen of the retractable screen structure and arranged on the fixed seat and slidable along a first direction, and an elastic assembly having a first end coupled to the fixed seat and a second end coupled to the sliding member, in which the second end of the elastic assembly and the flexible display screen are driven to move together when the sliding member slides along the first direction relative to the fixed seat.

Embodiments of the present disclosure provide a retractable screen structure. The retractable screen structure includes: a slide rail mechanism and a flexible display screen. The slide rail mechanism includes: a holder assembly including a holder; and a slide rail assembly including: a fixed seat fixedly coupled to the holder, a sliding member coupled to a flexible display screen of the retractable screen structure and arranged on the fixed seat and slidable along a first direction, and an elastic assembly having a first end coupled to the fixed seat and a second end coupled to the sliding member, in which the second end of the elastic assembly and the flexible display screen are driven to move together when the sliding member slides along the first direction relative to the fixed seat. A rotation shaft assembly is arranged on a side of the holder away from the slide rail assembly, an axial direction of the rotation shaft assembly being perpendicular to the first direction. The flexible display screen has a first end coupled to the sliding member and a second end wound around the rotation shaft assembly.

Embodiments of the present disclosure provide an electronic device. The electronic device includes: a housing including a first housing and a second housing arranged on the first housing and being slidable along a first direction, the first housing and the second housing forming a receiving structure having an opening; a retractable screen structure arranged within the receiving structure; and a drive assembly. The retractable screen structure includes: a slide rail mechanism and a flexible display screen. The slide rail mechanism includes: a holder assembly including a holder; and a slide rail assembly including: a fixed seat fixedly coupled to the holder, a sliding member coupled to a flexible display screen of the retractable screen structure and arranged on the fixed seat and slidable along a first direction, and an elastic assembly having a first end coupled to the fixed seat and a second end coupled to the sliding member, in which the second end of the elastic assembly and the flexible display screen are driven to move together when the sliding member slides along the first direction relative to the fixed seat. A rotation shaft assembly is arranged on a side of the holder away from the slide rail assembly, an axial direction of the rotation shaft assembly being perpendicular to the first direction. The flexible display screen has a first end coupled to the sliding member and a second end wound around the rotation shaft assembly. The rotation shaft assembly is arranged on a side close to the second housing, and the flexible display screen has a first end close to a bottom of the housing and a second end coupled to the first housing to cover the opening. The drive assembly is arranged within the receiving structure and coupled to the slide rail mechanism, and the drive assembly drives the slide rail mechanism to move along the first direction, in which the drive assembly drives the slide rail mechanism to move along the first direction, brings the second housing, the slide rail assembly, the first end of the flexible display screen and the sliding member to move along the first direction relative to the first housing, and allows the flexible display screen to switch between a retracted state and an expanded state.

BRIEF DESCRIPTION OF DRAWINGS

The drawings herein are incorporated into the specification and constitute a part of the specification, show embodiments consistent with the present disclosure, and together with the specification are used to explain the principles of the present disclosure.

DETAILED DESCRIPTION OF EMBODIMENTS

Figure 1:
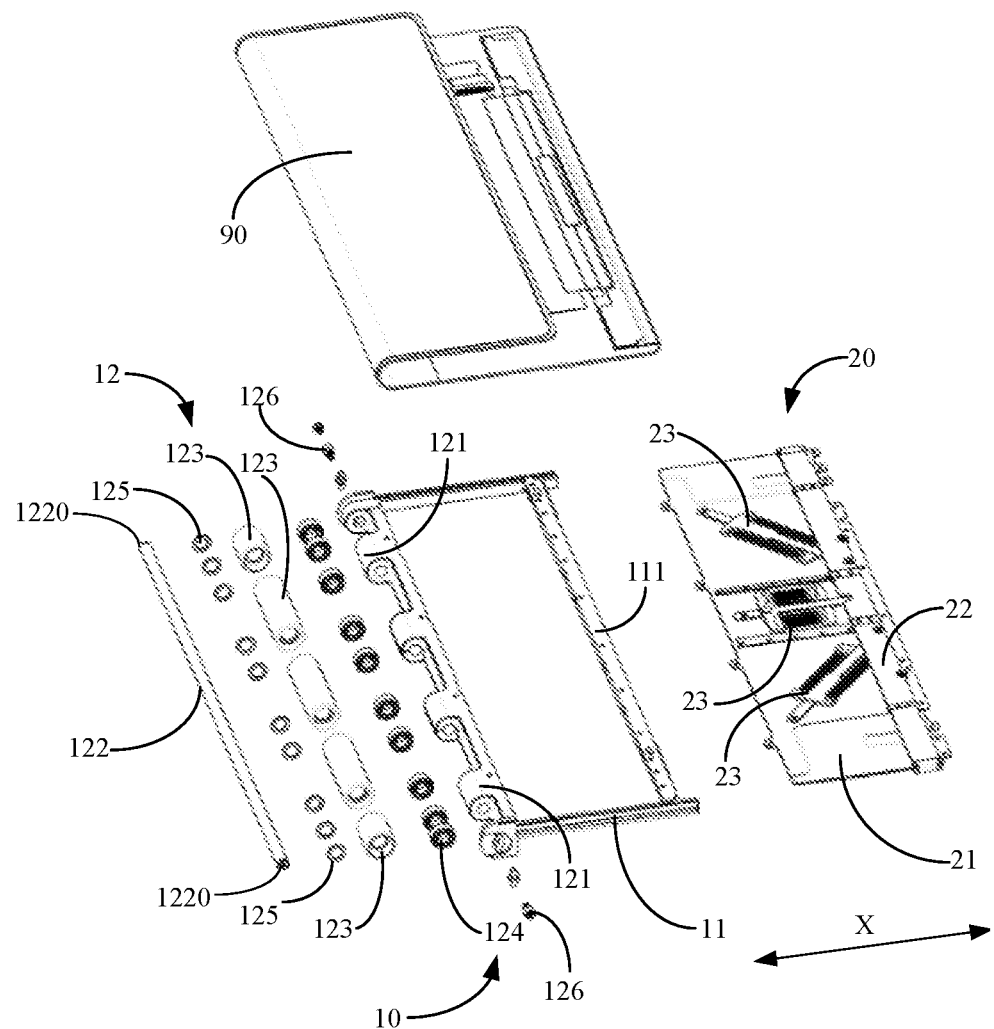
FIG. 1 is an exploded view of a retractable screen structure according to an exemplary embodiment of the present disclosure.

Exemplary embodiments will be described in detail, with examples thereof illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects of the present disclosure as recited in the appended claims.

Terms used herein in the description of the present disclosure are only for the purpose of describing specific embodiments and are not intended to limit the present disclosure. Unless otherwise defined, technical terms or scientific terms used herein shall be understood in the ordinary sense as appreciated by those of ordinary skill in the art to which the present application belongs. Terms such as "first" and "second" used in the specification and claims are not intended to indicate any sequence, quantity or significance of indicated technical features, and are merely used to distinguish different elements. Likewise, the words "a," "an" and the like used in the specification and claims are not intended to limit the quantity but indicate the presence of at least one element or device referred to by the words. The term "a plurality of" or "several" means two or more than two. Terms such as "front," "rear," "lower" and/or "upper" are merely for the convenience of description and not limited to a position or an orientation, unless indicated otherwise. Terms "comprising" or "containing" mean that the elements or articles before these terms "comprising" or "containing" includes the elements or articles listed after the terms "comprising" or "containing" and do not exclude other elements or articles. The terms "connected" or "coupled" and the like are not limited to physical or mechanical connection, but may include electrical connection, regardless of direct connection or indirect connection.

Terms used in the present disclosure are only used for describing specific embodiments and not intended to limit the present disclosure. As used in the specification and claims, the terms, "a," "the" and "the" in singular forms, are intended to include plural forms, unless clearly indicated in the context otherwise. It should also be understood that, as used herein, the term "and/or" represents and contains any one and all possible combinations of one or more associated listed items.

The present disclosure provides a slide rail mechanism, a retractable screen structure, and an electronic device. A slide rail mechanism, a retractable screen structure, and an electronic device of the present disclosure will be described in detail below in conjunction with the accompanying drawings, and features in the following embodiments and implementations may be combined with each other in the absence of conflict.

Figure 2:
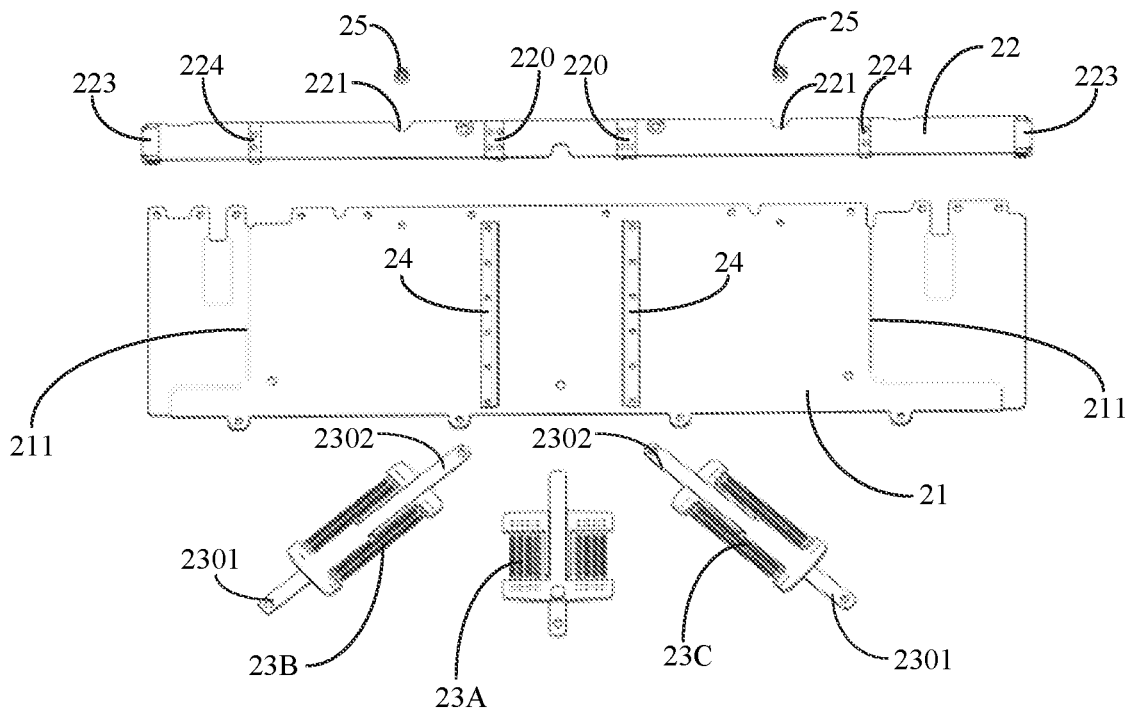
FIG. 2 is an exploded view of a slide rail assembly of a slide rail mechanism according to an exemplary embodiment of the present disclosure.
Figure 3:
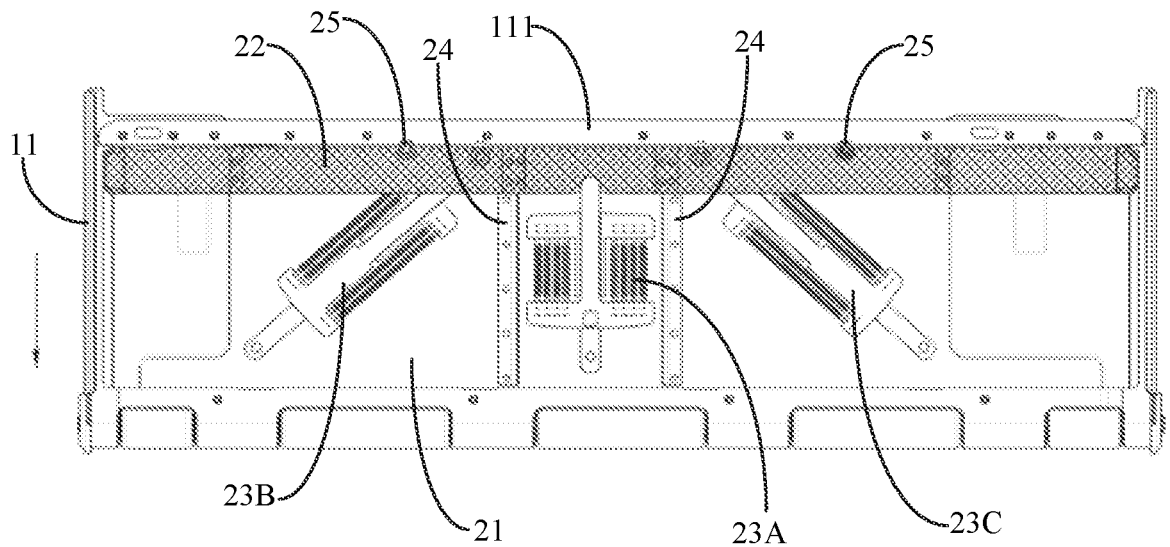
FIG. 3 is a schematic view of a slide rail mechanism according to an exemplary embodiment of the present disclosure.

Referring to FIGS. 1-3, embodiments of the present disclosure provide a slide rail mechanism for a retractable screen structure. The slide rail mechanism includes: a holder assembly 10 and a slide rail assembly 20. The holder assembly 10 includes a holder 11. The slide rail assembly 20 includes a fixed seat 21, a sliding member 22 coupled to the flexible display screen 90 of the retractable screen structure, and an elastic assembly 23. The fixed seat 21 is fixedly coupled to the holder 11. The sliding member 22 is arranged on the fixed seat 21 and is slidable along a first direction X (a vertical direction shown in FIG. 3). A first end 2301 of the elastic assembly 23 is coupled to the fixed seat 21, and a second end 2302 of the elastic assembly 23 is coupled to the sliding member 22. When the sliding member 22 slides in the first direction X relative to the fixed seat 21, the second end 2302 of the elastic assembly 23 and the flexible display screen 90 are driven to move together. The elastic assembly 23 is deformed by being stretched or compressed by the sliding member 22, thereby exerting pre-tension on the flexible display screen 90. It can be appreciated that the sliding member 22 slides downwards relative to the fixed seat 21 in a direction denoted by an arrow shown in FIG. 3, stretching the elastic assembly 23 and allowing the elastic assembly 23 to generate reversed tension.

Through the above arrangement, with the slide rail mechanism of the present disclosure, the sliding member 22 moves along the first direction X relative to the fixed seat 21 and can drive the flexible display screen 90 of the retractable screen structure to move together, achieving expansion and retraction of the flexible display screen 90. The sliding member 22 drives the elastic assembly 23 to move together, stretching the elastic assembly 23, which can produce pre-tension on the flexible display screen 90, and make the expansion of the flexible display screen 90 more smooth, to avoid causing problems such as screen bulging, swelling and distortion when the whole machine slides open.

In some possible embodiments, the slide rail assembly 20 further includes at least one guide rail 24 arranged on the fixed seat 21 and extending along the first direction X. The sliding member 22 has a slide slot 220 corresponding to the guide rail 24, and the sliding member 22 is slidably arranged in the guide rail 24 by the slide slot 220. In some embodiments, there are four groups of guide rails 24 symmetrically arranged on the fixed seat 21, so that the sliding member 22 slides more firmly. In other examples, the number of guide rails 24 may vary, which will not be limited in the present disclosure.

In some possible embodiments, the slide rail assembly 20 further includes at least one limit block 25 arranged at an end (i.e., an upper end in FIG. 3) of the fixed seat 21 away from the holder 11, and the sliding member 22 includes a limit portion 221 that fits against the limit block 25. The limit block 25 fits against the limit portion 221 of the sliding member 22, which can limit a start position of the sliding member 22 and prevent the sliding member 22 from coming out of the guide rail 24. In some embodiments, the limit portion 221 may be understood as a groove, and there are two limit blocks 25 symmetrically arranged on the fixed seat 21 and two limit portions 221 arranged in correspondence with the limit blocks 25, which will not be limited in the present disclosure. In an example shown in FIG. 3, the limit blocks 25 are arranged at the upper end of the fixed seat 21, and the start position of the sliding member 22 is located at the upper end of the fixed seat 21, in which state the elastic assembly 23 exerts elastic pre-tension on the sliding member 22 to keep the sliding member 22 in the start position.

Figure 4:
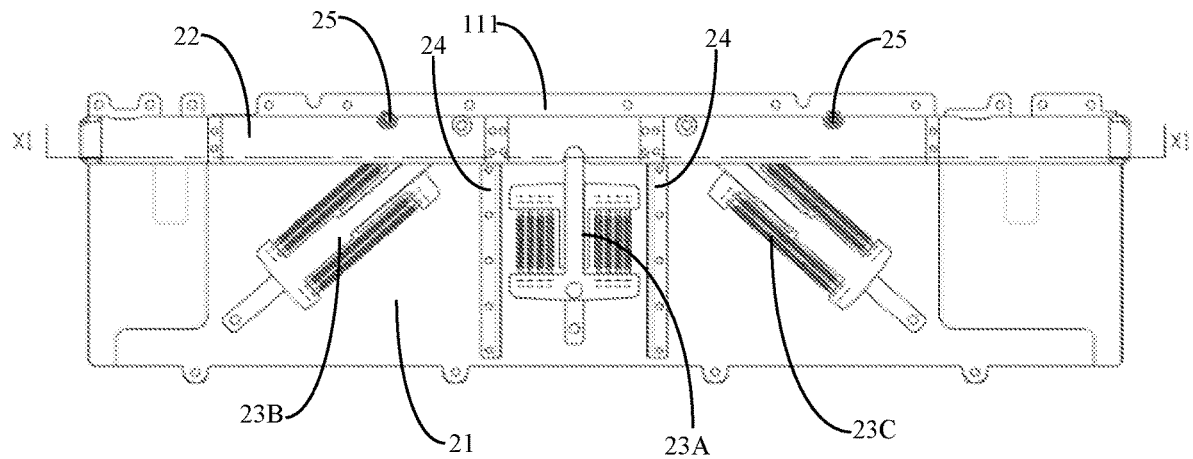
FIG. 4 is a schematic view of a slide rail assembly of a slide rail mechanism according to an exemplary embodiment of the present disclosure.
Figure 5:
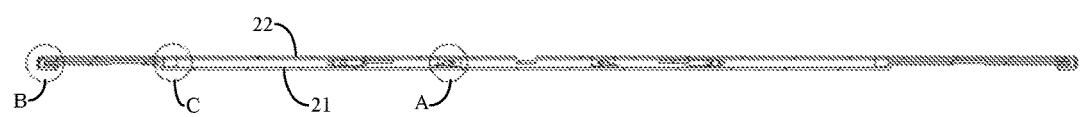
FIG. 5 is a sectional view along X1-X1 direction in FIG. 4.
Figure 6:
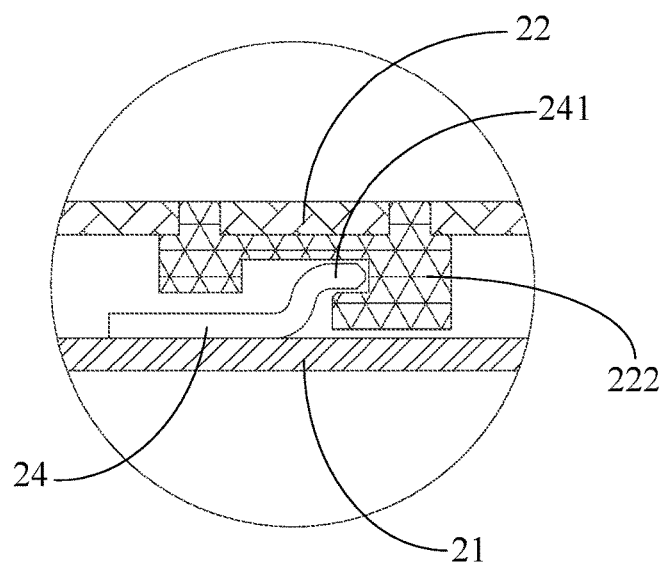
FIG. 6 is a partially enlarged view of part A in FIG. 5.

Referring to FIGS. 4 to 6, in some possible embodiments, the guide rail 24 includes a snap portion 241 on at least one side of the guide rail, and the sliding member 22 includes a first engagement portion 222, the snap portion 241 being snap-fitted to the first engagement portion 222. The sliding member 22 can be coupled to the guide rail 24 more firmly by the snap-fit between the first engagement portion 222 and the snap portion 241 of the guide rail 24, and the sliding member 22 can slide along the guide rail 24 more securely. It can be understood that the snap portion 241 may be an inverted hook structure formed by a sheet metal part to prevent the sliding member 22 from coming out of the guide rail 24. In some embodiments, both sides of the guide rail 24 have the snap portions 241, which will not be limited in the present disclosure.

Figure 7:
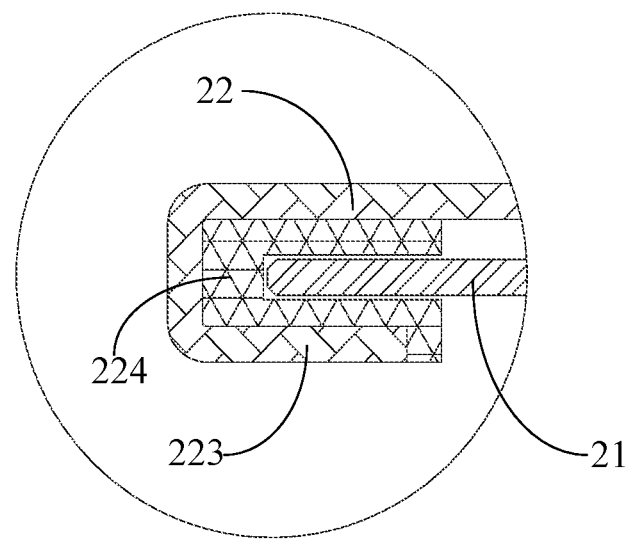
FIG. 7 is a partially enlarged view of part B in FIG. 5.

Referring to FIG. 7, in some possible embodiments, the sliding member 22 includes a second engagement portion 223 on a side of the sliding member, and the second engagement portion 223 is snap-fitted to a side of the fixed seat 21. Through the snap-fit between the second engagement portion 223 and the side of the fixed seat 21, the connection between the sliding member 22 and the fixed seat 21 becomes more stable, preventing the sliding member 22 from coming out of the fixed seat 21 and improving the stability of the sliding member 22 during sliding. Further, the slide rail assembly 20 also includes a plastic engagement portion 224 covering and snapped on the side of the fixed seat 21, and the second engagement portion 223 clamps the plastic engagement portion 224. The plastic engagement portion 224 can reduce friction between the second engagement portion 223 and the side of the fixed seat 21, and reduce wear to ensure smooth sliding. In some embodiments, the plastic engagement portion 224 may employ POM (polyoxymethylene resin) plastic that is a self-lubricating plastic. The sliding member 22 and the plastic engagement portion 224 can be combined together as a single part by a co-molding process (insert-molding), and a gap between the plastic engagement portion 224 and the side of the fixed seat 21 is designed to be 0.05 mm, to ensure that the sliding member 22 can only slide along an extension direction of the guide rail 24, i.e., the first direction X, to improve structural stability.

Figure 8:
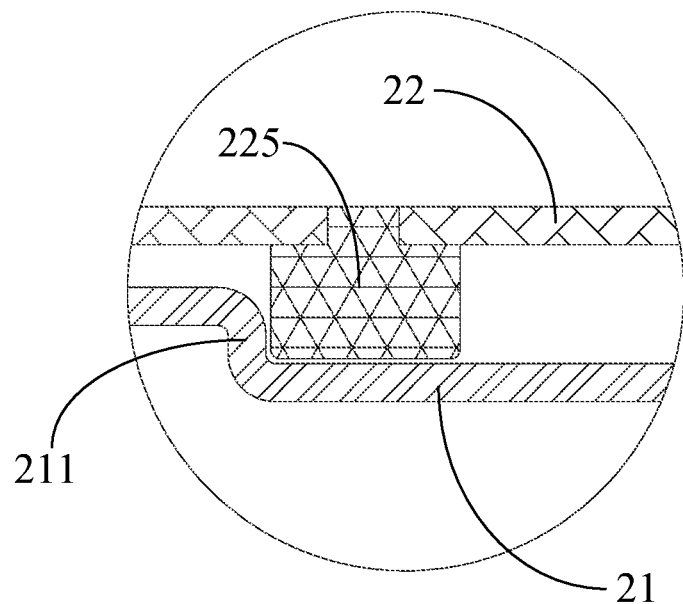
FIG. 8 is a partially enlarged view of part C in FIG. 5.

Referring to FIG. 8, in some possible implementations, the fixed seat 21 includes a step portion 211 extending along the first direction X; and the sliding member 22 includes an abutting block 225 that fits against the step portion 211. Since the abutting block 225 fits with the step portion 211, the sliding member 22 can be further prevented from coming out of the fixed seat 21.

Figure 9:
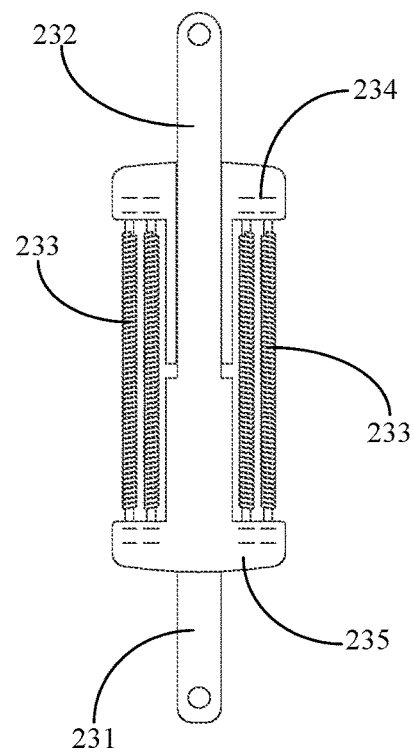
FIG. 9 is a schematic view of an elastic assembly of a slide rail mechanism according to an exemplary embodiment of the present disclosure.

Referring to FIG. 9, in some possible embodiments, the elastic assembly 23 includes a first rod member 231, a second rod member 232, and an elastic member 233. The first rod member 231 and the second rod member 232 are coupled together by insertion and capable of sliding relative to each other. The elastic member 233 is coupled between the first rod member 231 and the second rod member 232. The first rod member 231 is coupled to the fixed seat 21 and the second rod member 232 is coupled to the sliding member 22. The elastic member 233 may be a spring, a tension spring, etc., and exert pre-tension when assembled to keep the sliding member 22 in the start position. When the first rod member 231 and the second rod member 232 are pulled apart, the spring starts to work. When the sliding member 22 slides relative to the fixed seat 21, the second rod member 232 is driven to slide relative to the first rod member 231, and cooperates with the first rod member 231 to stretch or compress the elastic member 233. In such a way, the elastic member 233 deforms and generates an elastic force on the sliding member 22.

Further, each of the first rod member 231 and the second rod member 232 has the slide slot, and the first rod member and the second rod member are coupled together by insertion and are slidable relative to each other. A first end (a lower end in FIG. 9) of the first rod member 231 is fixed to the fixed seat 21 by rivets, and a first end (an upper end in FIG. 9) of the second rod member 232 is fixed to the sliding member 22 by rivets; a second end of the first rod member 231 protrudes outwardly to form a first bump 234, and a second end of the second rod member 232 protrudes outwardly to form a second bump 235. There are a plurality of groups of elastic members 233 evenly distributed between the first bump 234 and the second bump 235, to provide sufficient elastic force. When the sliding member 22 slides relative to the fixed seat 21, the second rod member 232 is driven to slide relative to the first rod member 231, and cooperates with the first rod member 231 to stretch the elastic member 233, so that the elastic member 233 deforms to produce reversed tension on the sliding member 22, ensuring that the flexible display screen is in a "tensioned" state.

In some possible embodiments, there are a plurality of the elastic assemblies 23, including a first elastic assembly 23A, a second elastic assembly 23B, and a third elastic assembly 23C. The second elastic assembly 23B and the third elastic assembly 23C are arranged symmetrically on both sides of the first elastic assembly 23A. An elastic member 233 of the first elastic assembly 23A extends along the first direction X, and elastic members 233 of the second elastic assembly 23B and the third elastic assembly 23C are arranged symmetrically along the first direction X and obliquely relative to the first direction X.

Due to the limited space, a single rail can hardly have such a large elastic stroke. With the above arrangement, three groups of elastic assemblies can form a relay to improve the sliding stroke of the elastic assemblies, among which the second elastic assembly 23B and the third elastic assembly 23C have the same design and are symmetrically arranged on both sides of the first elastic assembly 23A; an initial amount of compression of the elastic member of the first elastic assembly 23A may be slightly larger than an initial amount of compression of the elastic member of the second elastic assembly 23B and an initial amount of compression of the elastic member of the third elastic assembly 23C, to increase the sliding stroke. Assuming that a total sliding stroke is designed to be 30.00 mm, the first elastic assembly 23A can start to work when the sliding member 22 has slid by 19 mm.

In some possible implementations, the slide rail assembly 20 as a whole may be fixed to the holder 11 by riveting. The holder 11 may include a connection plate 111 at one end of the holder, and the fixed seat 21 may be a stamped metal plate fixed to the connection plate 111 by a riveting process. The flexible display screen 90 is fixed to the sliding member 22 of the slide rail assembly 20. The holder 11 may be made of aluminum alloy to improve the structural strength. The sliding member 22 may be made of SUS stainless steel plate and POM plastic by a co-molding process. The stainless steel plate can act as a main body to provide strength support. The slide slot may be formed by POM plastic injection molding and can slide relative to the fixed seat 21 and the guide rail 24 to reduce friction. The limit block 25 may be made of plastic, and can limit the start position of the sliding member 22 and prevent the sliding member 22 from coming out of the guide rail 24. The guide rail 24 may be formed by a stainless steel stamping process and fixed on the fixed seat 21 by spot welding. In cooperation with the slide slot 220 on the sliding member 22, an inverted hook structure is formed to prevent the sliding member 22 from coming out of the guide rail 24 when sliding. An exposed surface of the sliding member 22 may act as an adhesive area 226 to affix to the flexible display screen 90.

Referring to FIG. 1 again, embodiments of the present disclosure provide a retractable screen structure including the slide rail mechanism and the flexible display screen 90 as described in the above embodiments. A rotation shaft assembly 12 is arranged on a side of the holder 11 away from the slide rail assembly 20, and an axial direction of the rotation shaft assembly 12 is perpendicular to the first direction X. The flexible display screen 90 has a first end 901 coupled to the sliding member 22 and a second end 902 wound around the rotation shaft assembly 12.

Through the above arrangement, the sliding member 22 moves along the first direction X relative to the fixed seat 21 and can drive the flexible display screen 90 to move together, to realize the expansion and retraction of the flexible display screen 90. The sliding member 22 drives the elastic assembly 23 to move together and stretches the elastic assembly 23, which can produce pre-tension on the flexible display screen 90 and make the flexible display screen 90 more flat during expansion, to avoid causing problems such as screen bulging, swelling and distortion when the whole machine slides open.

In some possible implementations, the rotation shaft assembly 12 includes a rotation shaft support 121, a rotation shaft 122 and a rotation wheel 123. The rotation shaft support 121 is arranged on the side of the holder 11 away from the slide rail assembly 20. The rotation shaft 122 passes through the rotation shaft support 121. The rotation wheel 123 is fitted over the rotation shaft 122, and the second end of the flexible display screen 90 is wound around the rotation wheel 123. When the flexible display screen 90 moves along with the slide rail assembly 22, the rotation wheel 123 passively rotates, making the expansion and retraction of the flexible display screen 90 more smooth.

In some embodiments, the flexible display screen 90 consists of a flexible OLED screen attached to an extremely thin layer of stainless steel mesh, which is highly flexible. There may be a plurality of rotation shaft supports 121 spaced apart from one another along a second direction perpendicular to the first direction X. There may be a plurality of rotation wheels 123, one rotation wheel being assembled between two adjacent rotation shaft supports 121. Depending on space between two adjacent rotation shaft supports 121, there may be large and small rotation wheels assembled in suitable positions. The rotation wheel 123 may be made of engineering plastic POM by injection molding, with a through hole in the middle and slots on both ends to receive bearings 124, and the rotation wheel 123 is fitted over the rotation shaft 122 and can passively rotate around the rotation shaft 122 via the bearings 124 after being assembled. The rotation shaft 122 may adopt a D-shaped shaft, and the D-shaped cross section mainly serves to fix a bearing inner ring to prevent the bearing inner ring from rotating with the rotation shaft. The rotation shaft 122 may be made of stainless steel and passes through the plurality of rotation shaft supports 121. The rotation shaft 122 includes screw threads 1220 on both ends and can be fixed to a middle frame of the electronic device by a fastener such as a screw 126, to realize fixation of the rotation shaft. The screw 126 may be made of metals. The screw may include a child-mother screw with a screw rod on one end, passing through a screw washer to be fastened to the rotation shaft to lock the screw washer and the rotation shaft tightly. The bearing 124, which may be made of stainless steel or ceramic, is assembled on the rotation wheel 123, and each rotation wheel 123 is assembled with one bearing 124 and a bearing spacer 125, separately on both ends of the rotation wheel. The bearing spacer 125 may be made of metal materials. When the rotation wheels are mounted to the rotation shaft, one bearing spacer is arranged on each of both sides of each rotation wheel, and the rotation shaft passes through an inner hole of the bearing spacer. When both ends of the rotation shaft are locked by the screw, the bearing spacer serves to fix the bearing inner ring and prevent the bearing inner ring from rotating along with a bearing outer ring, and has a function of grounding the bearing to the holder.

Figure 10:
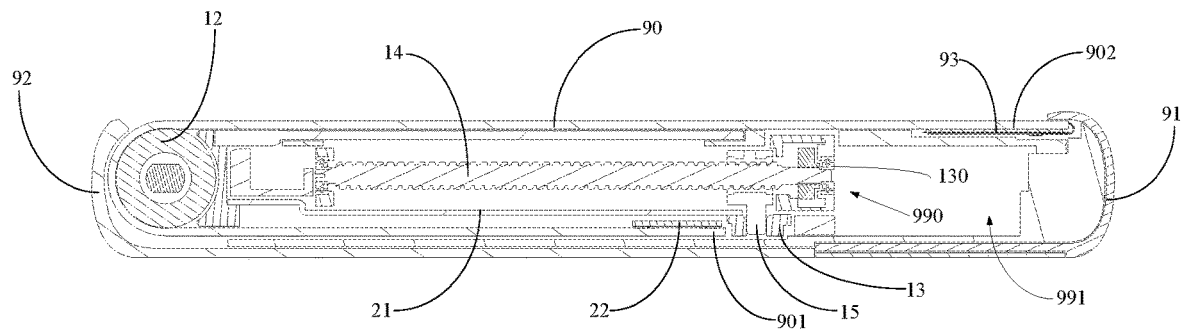
FIGS. 10-11 are schematic views of an electronic device with a flexible display screen in a retracted state and in an expanded state, respectively, according to an exemplary embodiment of the present disclosure.
Figure 11:
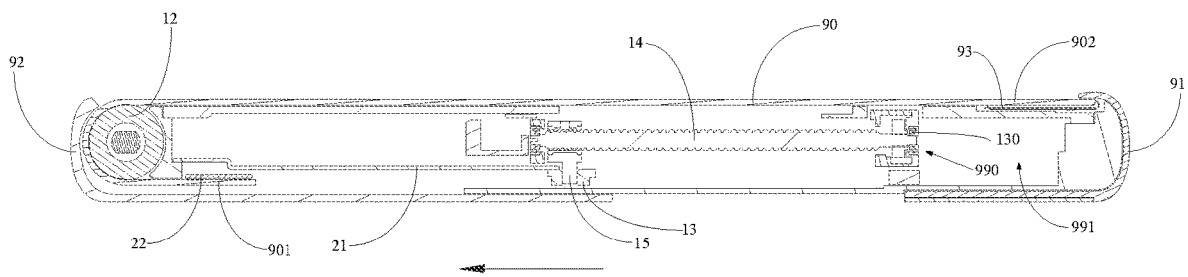
Figure 12:
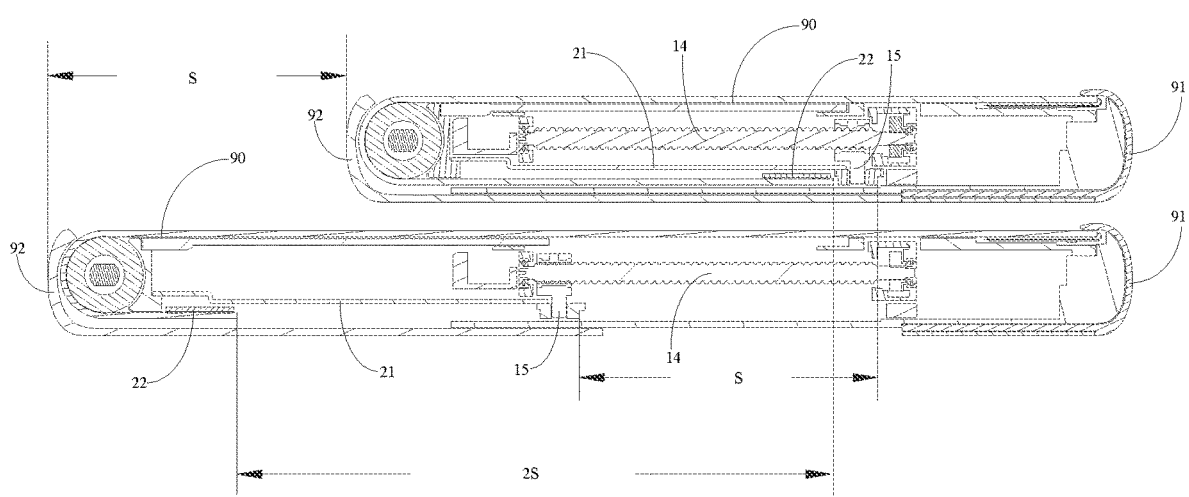
FIG. 12 is a comparison diagram illustrating an electronic device with a flexible display screen in a retracted state and in an expanded state, according to an exemplary embodiment of the present disclosure.

Referring to FIGS. 10 to 12, embodiments of the present disclosure provide an electronic device that may be a cell phone, a mobile terminal, a tablet computer, a laptop computer, a terminal handheld device with a screen, an in-vehicle display device, and the like. The electronic device includes a housing, the retractable screen structure as described in the above embodiments, and a drive assembly 990.

The housing includes a first housing 91 and a second housing 92 slidably arranged on the first housing 91 along the first direction X. The first housing 91 and the second housing 92 form a receiving structure 991 having an opening. The retractable screen structure is arranged within the receiving structure 991; the rotation shaft assembly 12 is arranged on a side close to the second housing 92; the first end 901 of the flexible display screen 90 is close to a bottom of the housing and the second end 902 of the flexible display screen 90 is coupled to the first housing 91 to cover the opening. The drive assembly 990 is arranged within the receiving structure 991, and the drive assembly 990 is coupled to the slide rail mechanism to drive the slide rail mechanism to move in the first direction X. In some embodiments, the first housing 91 may include a support plate 93, and the second end of the flexible display screen 90 is coupled to the support plate 93, which may provide support and protection for the flexible display screen 90.

The drive assembly 990 drives the slide rail mechanism to move along the first direction X, bringing the second housing 92, the slide rail assembly 20, the first end of the flexible display screen 90 and the sliding member 22 to move along the first direction X relative to the first housing 91, and allowing the flexible display screen 90 to switch between a retracted state and an expanded state.

As shown in FIG. 10, the sliding member 22 in the start position is subjected to a preload force of the elastic assembly due to the preload of the elastic member of the elastic assembly and remains stationary in the start position due to the presence of the limit block 25, in which case the flexible display screen 90 is in the retracted state.

The drive assembly 990 as a power source is fixed to the middle frame (also known as the housing) of the whole machine, and the electronic device receives a command through UI and controls the drive assembly 990 to drive the slide rail mechanism to move in the first direction X (i.e., moving leftwards in FIG. 11), so that the slide rail mechanism as a whole slides out relative to the first housing 91 in a direction away from the first housing 91. During this process, the first end of the flexible display screen 90 slides together with the sliding member 22, and the rotation wheel of the rotation shaft assembly passively rotates under the force of the flexible display screen 90. Since the second end of the flexible display screen 90 is coupled to the first housing 91, an effect of expanding the flexible display screen 90 gradually can be achieved as the slide rail mechanism gradually slides out, as shown in FIG. 11. During the sliding process of the slide rail mechanism, the sliding member 22 can move from one end of the fixed seat 21 to the other end of the fixed seat under the pull of the flexible display screen, which can further increase an expanding length of the flexible display screen 90. Moreover, during the sliding process, the elastic assembly is stretched by the sliding member 22 and exerts, on the sliding member 22, elastic tension with a reverse direction opposite to a sliding direction, the flexible display screen 90 is always subject to the tension in the reverse direction, which is equivalent to pulling the flexible display screen 90 rightwards. As a result, the flexible display screen 90 expanded is more flat, and a trajectory of bending the flexible display screen 90 conforms to the design intention, to avoid causing problems such as screen bulging, swelling and distortion when the whole machine slides open.

It can be understood that throughout the process, the sliding member 22 is pulled by the second end of the flexible display screen 90 and can move from one end of the fixed seat 21 to the other end thereof. Assuming that the slide rail mechanism slides out for a stroke of S relative to the first housing 91 and the sliding member 22 slides for a stroke of S, the first end of the flexible display screen 90 moves for a distance of 2S along with the slide rail mechanism relative to the first housing 91.

When the whole machine receives an external command for retraction, a drive motor 130 starts to drive reversely, retracting the slide rail mechanism and the flexible display screen. In this process, the holder and the fixed seat are driven by the drive assembly 990 to move in the reverse direction, the flexible display screen and the sliding member are gradually retracted under the elastic force of the elastic assembly, and the sliding member returns to the start position under the elastic force of the elastic assembly, thus restoring the flexible display screen to the retracted state. Therefore, the use of the slide rail mechanism of the present disclosure can smoothly and effectively ensure that the flexible display screen keeps a bending form throughout the sliding opening and retracting process, and that the power loss caused by the friction generated in the process of sliding opening and retracting the screen is at a low level, and realize practical and easily attainable solutions to guarantee product reliability.

Referring to FIGS. 10 and 11, in some possible embodiments, the holder 11 includes a transmission member 13. The drive assembly 990 includes the drive motor 130, a screw rod 14 coupled to the drive motor 130, and a nut 15 fitted over the screw rod 14. The screw rod 14 extends along the first direction X, and the nut 15 abuts against the transmission member 13. The drive motor 130 drives the screw rod 14 to rotate, bringing the nut 15 and the transmission member 13 to move along the first direction X, and bringing the slide rail mechanism to move along the first direction X. It should be noted that the drive assembly 990 may also adopt a rack-and-pinion structure, a worm-and-gear structure and the like.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope of the present disclosure are indicated by the following claims.

It should be understood that the present disclosure is not limited to the particular structures described above and shown in the drawings, and various modifications and changes can be made without departing from the scope of the present disclosure. The scope of the present disclosure is only limited by the appended claims.

What is claimed is:

1. A slide rail mechanism for a retractable screen structure, comprising:
   a holder assembly comprising a holder; and
   a slide rail assembly comprising:
      a fixed seat fixedly coupled to the holder;
      a sliding member coupled to a flexible display screen of the retractable screen structure and arranged on the fixed seat and slidable along a first direction; and
      an elastic assembly having a first end coupled to the fixed seat and a second end coupled to the sliding member,
   wherein the second end of the elastic assembly and the flexible display screen are driven to move together when the sliding member slides along the first direction relative to the fixed seat, and
   wherein the elastic assembly comprises a first rod member, a second rod member, and an elastic member, the first rod member and the second rod member being coupled together by insertion, and the elastic member being coupled between the first rod member and the second rod member;
   the first rod member is coupled to the fixed seat, and the second rod member is coupled to the sliding member;
   the second rod member is driven to slide relative to the first rod member, and cooperates with the first rod member to stretch or compress the elastic member, when the sliding member slides relative to the fixed seat.

2. The slide rail mechanism according to claim 1, wherein:
   the slide rail assembly further comprises at least one guide rail arranged on the fixed seat and extending along the first direction;
   the sliding member is slidably arranged on the guide rail.

3. The slide rail mechanism according to claim 2, wherein the guide rail comprises a snap portion on at least one side of the guide rail, and the sliding member comprises a first engagement portion snap-fitted to the snap portion.

4. The slide rail mechanism according to claim 1, wherein:
   the slide rail assembly further comprises at least one limit block arranged at an end of the fixed seat away from the holder; and
   the sliding member comprises a limit portion fitting against the limit block.

5. The slide rail mechanism according to claim 1, wherein the sliding member comprises a second engagement portion on a side of the sliding member, and the second engagement portion is snap-fitted to a side of the fixed seat.

6. The slide rail mechanism according to claim 5, wherein the slide rail assembly further comprises a plastic engagement portion covering and snapped on the side of the fixed seat, and the second engagement portion clamps the plastic engagement portion.

7. The slide rail mechanism according to claim 1, wherein the fixed seat comprises a step portion extending along the first direction, and the sliding member comprises an abutting block fitting against the step portion.

8. The slide rail mechanism according to claim 1, wherein a plurality of the elastic assemblies comprise a first elastic assembly, a second elastic assembly, and a third elastic assembly, the second elastic assembly and the third elastic assembly being symmetrically arranged on both sides of the first elastic assembly;
an elastic member of the first elastic assembly extends along the first direction, and elastic members of the second elastic assembly and the third elastic assembly are symmetrically arranged along the first direction and obliquely relative to the first direction.

9. The slide rail mechanism according to claim 1, wherein:
the first rod member has a first end fixed to the fixed seat and a second end protruding outwardly and forming a first bump;
the second rod member has a first end fixed to the sliding member and a second end protruding outwardly and forming a second bump; and
a plurality of groups of elastic members are evenly distributed between the first bump and the second bump.

10. The slide rail mechanism according to claim 8, wherein an initial amount of compression of the elastic member of the first elastic assembly is slightly larger than an initial amount of compression of the elastic member of the second elastic assembly and an initial amount of compression of the elastic member of the third elastic assembly.

11. The slide rail mechanism according to claim 1, wherein the holder comprises a connection plate at an end, and the fixed seat is fixed to the connection plate.

12. The slide rail mechanism according to claim 2, wherein the guide rail is formed by a stainless steel stamping process and fixed on the fixed seat by spot welding.

13. The slide rail mechanism according to claim 1, wherein an exposed surface of the sliding member is an adhesive area and the flexible display screen affixes to the adhesive area.

14. A retractable screen structure, comprising:
a slide rail mechanism comprising:
a holder assembly comprising a holder; and
a slide rail assembly comprising:
a fixed seat fixedly coupled to the holder;
a sliding member coupled to a flexible display screen of the retractable screen structure and arranged on the fixed seat and slidable along a first direction; and
an elastic assembly having a first end coupled to the fixed seat and a second end coupled to the sliding member,
wherein the second end of the elastic assembly and the flexible display screen are driven to move together when the sliding member slides along the first direction relative to the fixed seat, and a rotation shaft assembly is arranged on a side of the holder away from the slide rail assembly, an axial direction of the rotation shaft assembly being perpendicular to the first direction; and
a flexible display screen having a first end coupled to the sliding member and a second end wound around the rotation shaft assembly.

15. The retractable screen structure according to claim 14, wherein the rotation shaft assembly comprises:
a rotation shaft support arranged on the side of the holder away from the slide rail assembly;
a rotation shaft passing through the rotation shaft support; and
a rotation wheel fitted over the rotation shaft, the second end of the flexible display screen being wound around the rotation wheel.

16. The retractable screen structure according to claim 15, wherein the rotation shaft is a D-shaped shaft.

17. The retractable screen structure according to claim 15, wherein the rotation wheel is assembled with a bearing and a bearing spacer on each end of the rotation wheel.

18. An electronic device, comprising:
a housing comprising a first housing and a second housing arranged on the first housing and being slidable along a first direction, the first housing and the second housing forming a receiving structure having an opening;
a retractable screen structure arranged within the receiving structure,
wherein the retractable screen structure comprises:
a slide rail mechanism comprising:
a holder assembly comprising a holder; and
a slide rail assembly comprising:
a fixed seat fixedly coupled to the holder;
a sliding member coupled to a flexible display screen of the retractable screen structure and arranged on the fixed seat and slidable along a first direction; and
an elastic assembly having a first end coupled to the fixed seat and a second end coupled to the sliding member,
wherein the second end of the elastic assembly and the flexible display screen are driven to move together when the sliding member slides along the first direction relative to the fixed seat, and a rotation shaft assembly is arranged on a side of the holder away from the slide rail assembly, an axial direction of the rotation shaft assembly being perpendicular to the first direction; and
a flexible display screen having a first end coupled to the sliding member and a second end wound around the rotation shaft assembly,
wherein the rotation shaft assembly is arranged on a side close to the second housing, and the flexible display screen has a first end close to a bottom of the housing and a second end coupled to the first housing to cover the opening; and
a drive assembly arranged within the receiving structure and coupled to the slide rail mechanism, the drive assembly driving the slide rail mechanism to move along the first direction, wherein the drive assembly drives the slide rail mechanism to move along the first direction, brings the second housing, the slide rail assembly, the first end of the flexible display screen and the sliding member to move along the first direction relative to the first housing, and allows the flexible display screen to switch between a retracted state and an expanded state.

19. The electronic device according to claim 18, wherein:
the drive assembly comprises a drive motor, a screw rod coupled to the drive motor, and a nut fitted over the screw rod, the screw rod extending along the first direction and the nut abutting against the holder;
the drive motor drives the screw rod to rotate, and brings the nut and the holder to move along the first direction and brings the slide rail mechanism to move along the first direction.

\* \* \* \* \*